United States Patent Office 3,299,353
Patented Jan. 17, 1967

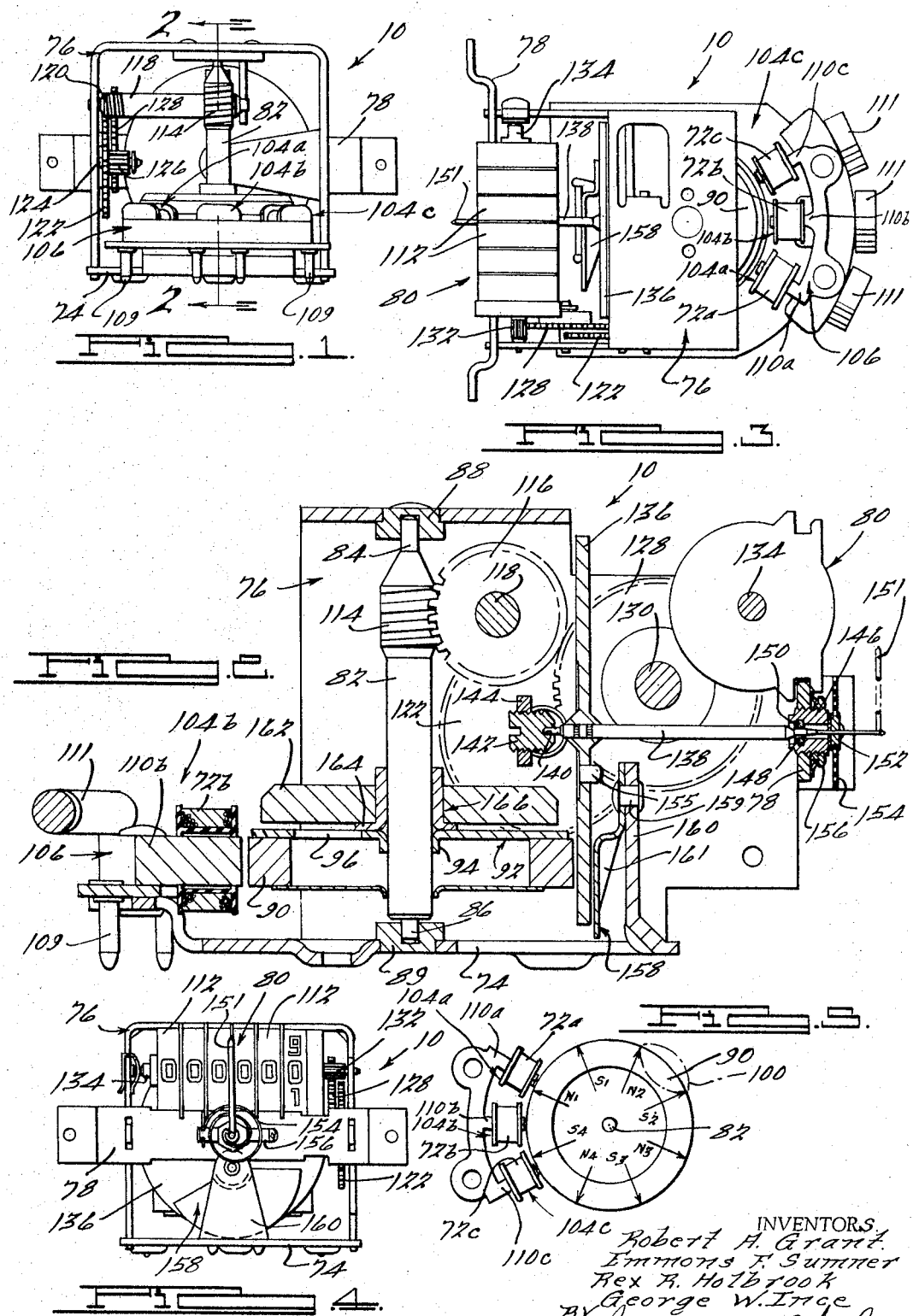

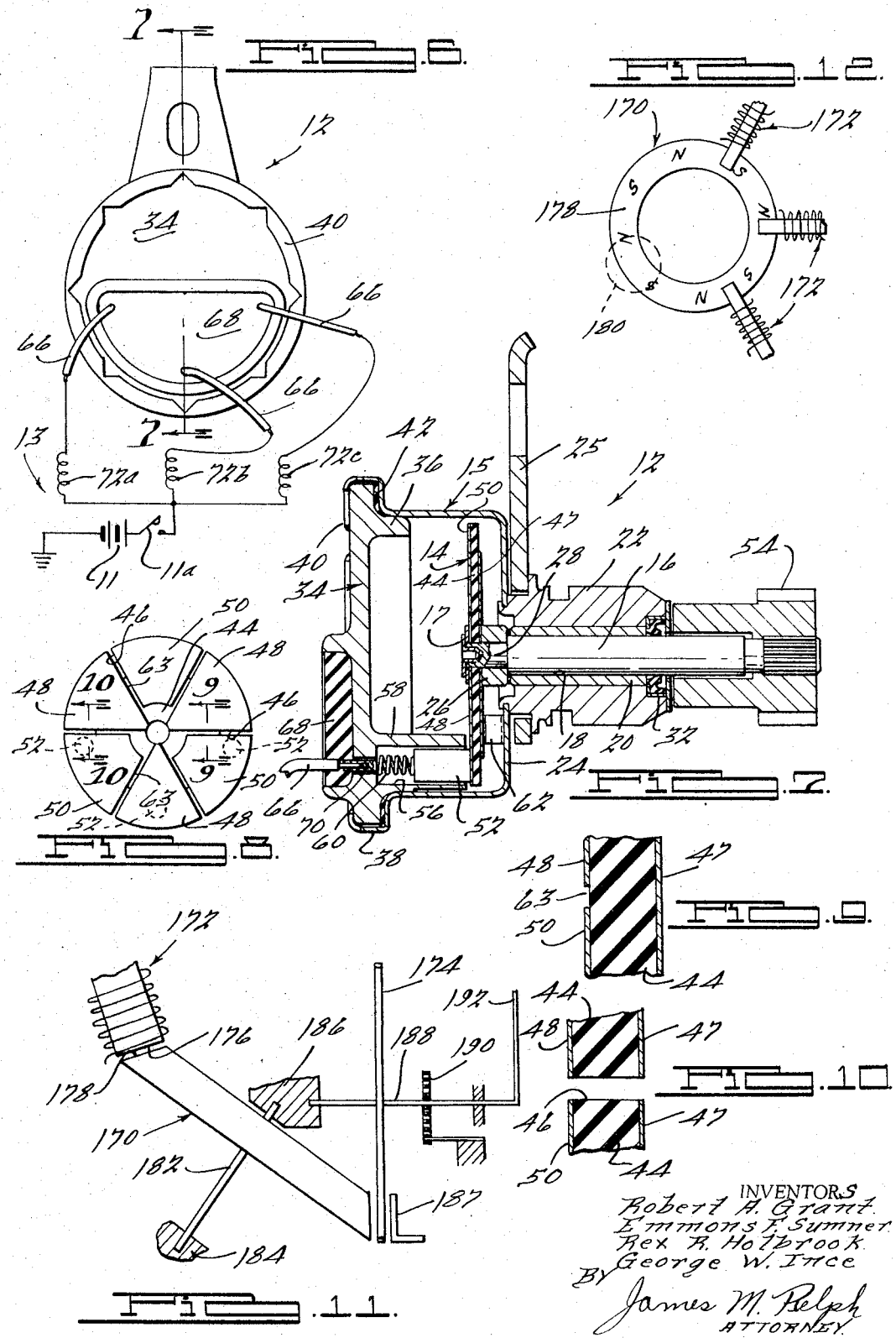

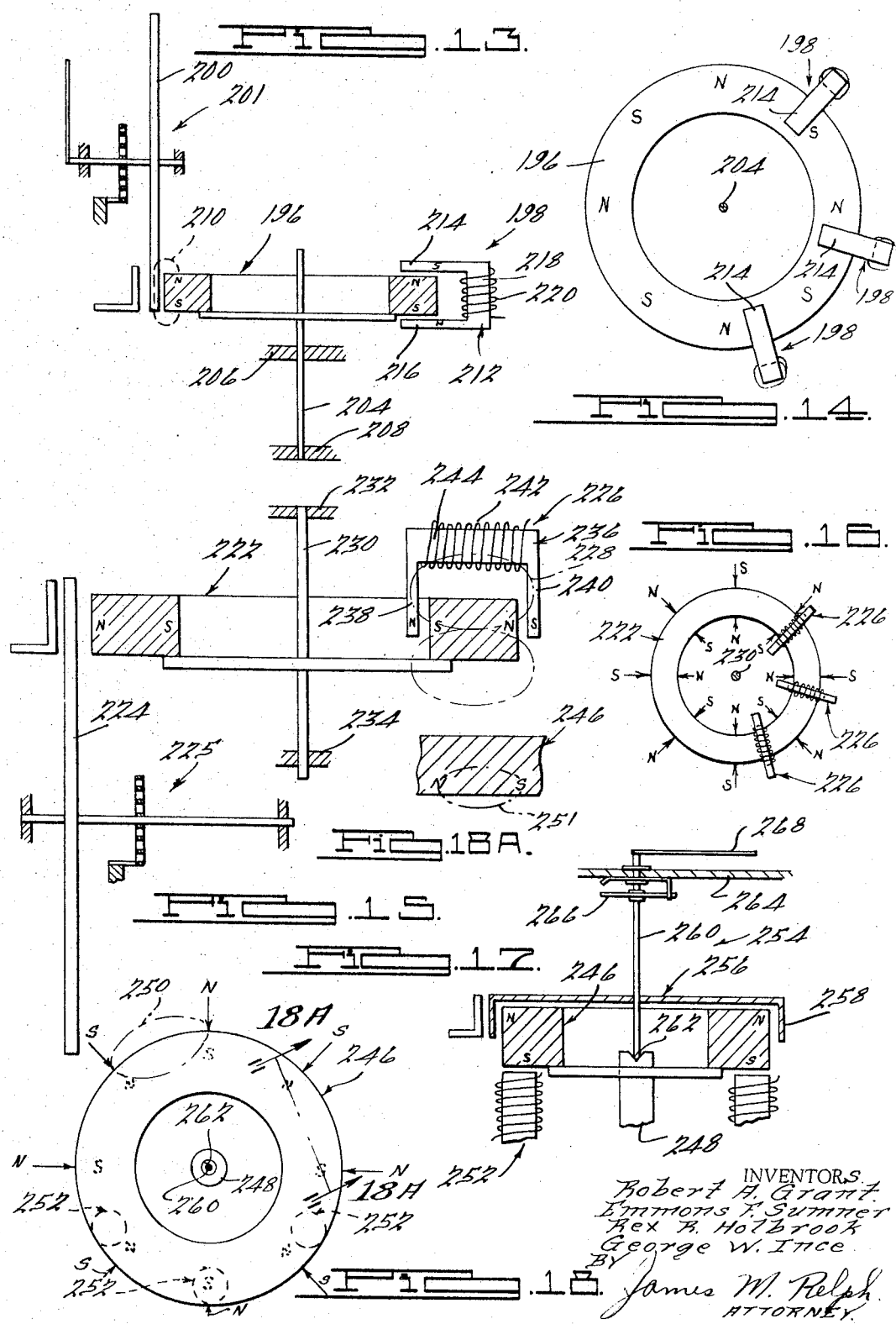

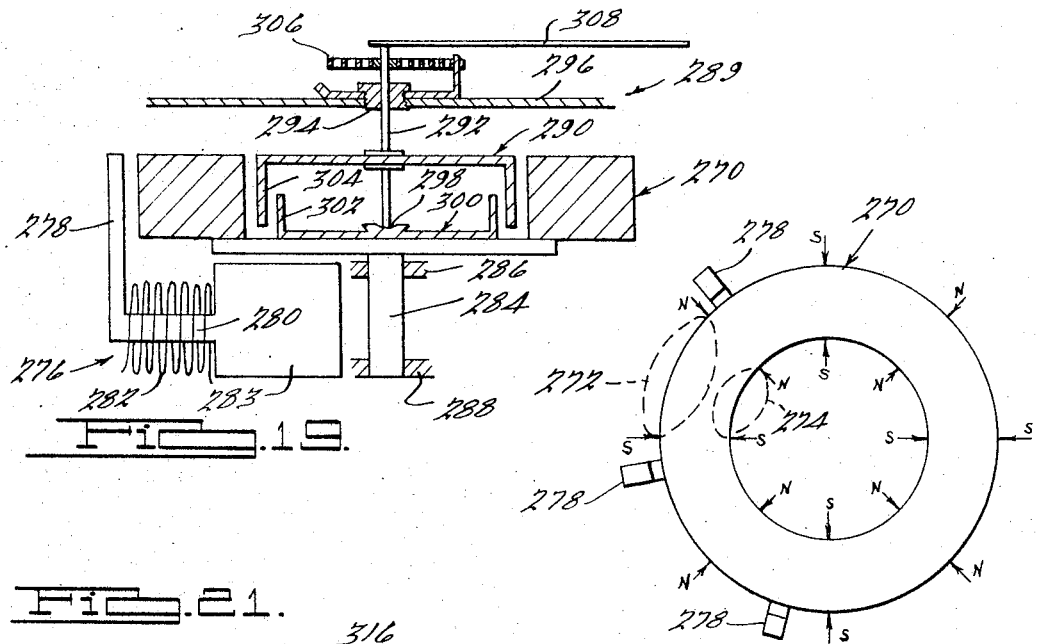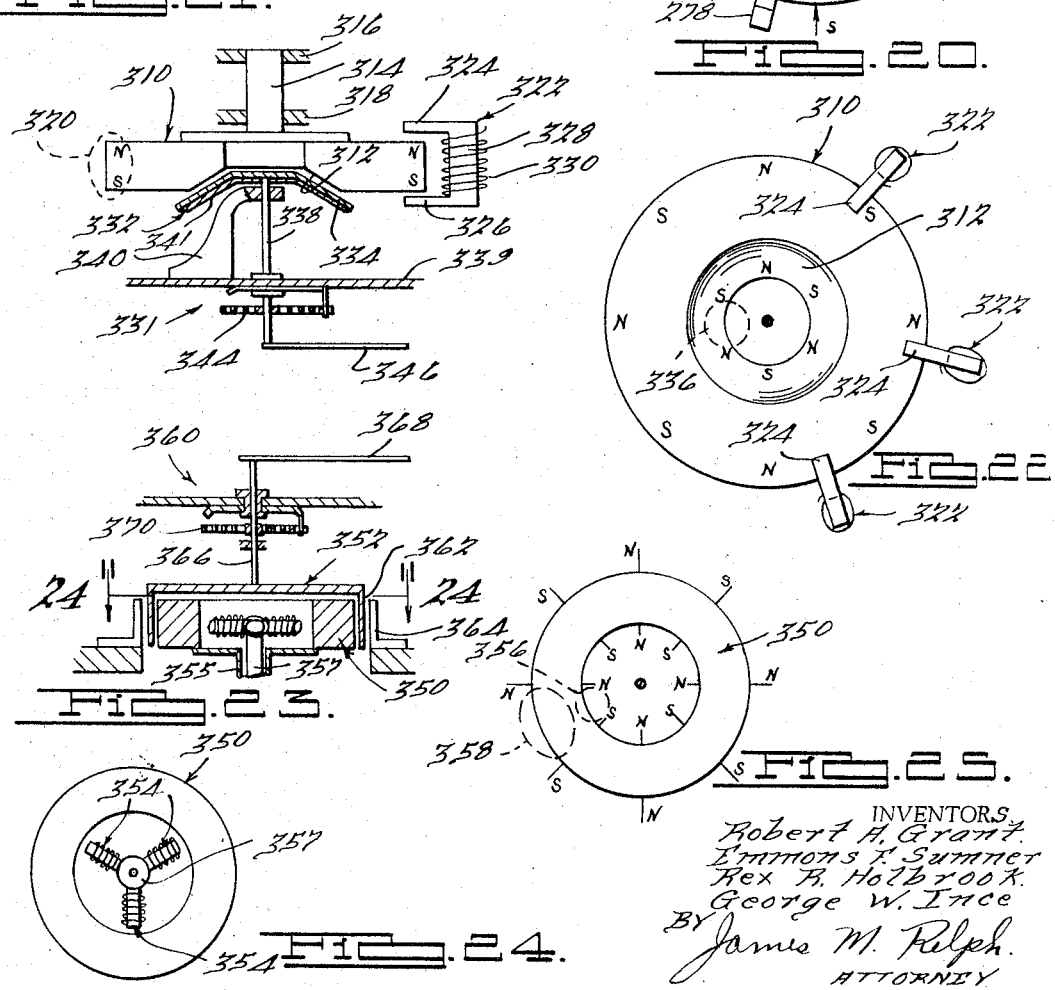

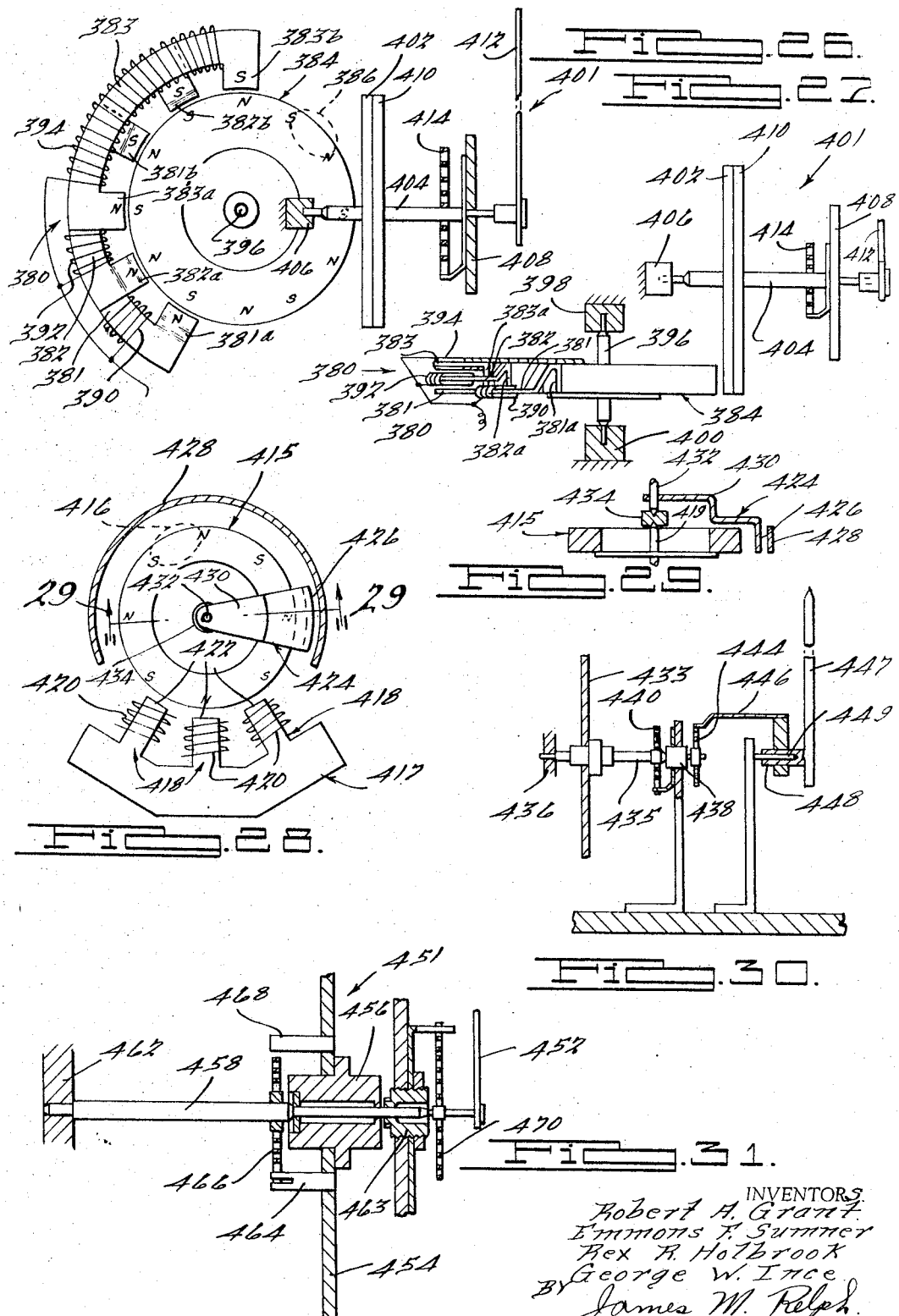

3,299,353
ELECTRICAL SPEEDOMETER UTILIZING UNSYMMETRICALLY POSITIONED FIELD COILS
Robert A. Grant, Emmons F. Sumner, Rex R. Holbrook, and George W. Ince, Ann Arbor, Mich., assignors to King-Seeley Thermos Co., Ann Arbor, Mich., a corporation of Michigan
Filed June 8, 1962, Ser. No. 201,038
20 Claims. (Cl. 324—70)

This invention relates to speedometers and more particularly to improved electric speedometers of the type including a sender actuated by a rotatable part the speed of which is to be measured and a receiver located remotely from and electrically connected to said sender for indicating the speed and number of revolutions of the rotatable part.

Prior electric speedometers generally comprise a receiver having a rotor and a stator including a plurality of field electromagnets spaced uniformly around the rotor. Such field magnets are sequentially energized by electrical impulses from a sender actuated by a rotatable part such as the drive shaft of a vehicle. Such sequential energization produces a step-wise advancing field of force which interacts with the rotor to drive it as a synchronous type pulse motor. Such rotors are operatively associated with suitable speed indicating means and may be operatively associated with odometer means for measuring distance.

In some cases such prior electric speedometers indicate the speed of the rotating part by means of permanent magnets which are driven by the pulse motor so as to create a rotating magnetic field which interacts with a speed indicating element of non-magnetic conductive material. Such interaction produces eddy currents in the speed indicating element that in turn produce magnetic fields which interact with the rotating magnetic fields to create a magnetic coupling between the permanent magnets and the speed indicating element. Such a magnetic coupling turns the indicating element against the force of a return spring to hold a pointer in a position of equilibrium depending on the rotative speed of the permanent magnets. A suitably marked scale is positioned relative to the pointer so that the speed of the movable part can be directly ascertained.

In accordance with certain aspects of the present invention, electric speedometers are improved by so grouping three or more field electromagnets within an arcuate portion on the periphery of a rotor which is less than 180° such that the rotor will not reverse its direction of rotation. The rotor may be of a magnetically permeable material such as soft iron or be permanently magnetized. In case of the soft iron rotor, suitable radial projections are included thereon which will be attracted by the field electromagnets. Permanent magnet means may be rotated with such a rotor to establish a rotating magnetic field which will coact with speed indicating apparatus as discussed above. When the rotor itself is permanently magnetized it will establish a rotating magnetic field to drive such speed indicating apparatus.

Such a permanently magnetized rotor may, for example, be a ring of barium ferrite or other suitable material having a high coercive force, i.e., material which is difficult to magnetize, but once magnetized, is difficult to demagnetize. Thus, distinct magnetic poles can be permanently formed in such a ring rotor which will coact with the field magnets to produce the desired synchronous motor action. The magnetic poles formed in such a ring rotor will not influence one another so that mutually distinct patterns of magnetic circuits can be formed on different portions of the rotor. For example, a plurality of first magnetic circuits can be formed on the outer periphery of such a ring-type rotor and a plurality of second magnetic circuits can be formed on its inner periphery. The influence of the first and second magnetic circuits will not overlap. Thus, the first plurality of magnetic circuits might, for example, be especially suited for driving speed indicating apparatus and the second plurality of magnetic circuits might be especially suited for interaction with field electromagnets for producing the desired synchronous motor action.

One advantage of the unsymmetrical field electromagnet arrangement is that a speed indicating element can be located in an operative relationship with a permanently magnetized rotor at a point isolated from the varying magnetic fields produced by the field electromagnets driving the rotor. Such an arrangement reduces the effect of such varying magnetic fields on the operation of the speed indicating element. It will, therefore, more accurately indicate the rotative speed of the permanently magnetized rotor.

Another aspect of the present invention is the effect of the unsymmetrically arranged field electromagnets on bearing means for rotatably supporting the rotor-carrying shaft portion of speedometers. In cases in which the field poles are spaced uniformly around the rotor, such a shaft portion will move laterally within its support bearing as the stator field advances around the outer periphery of the rotor to produce impact forces between the shaft and its support bearings which cause substantial noise problems and excessive wear. The improved arrangement of a magnetized rotor having unsymmetrically grouped field electromagnets along the outer periphery thereof causes the rotor to be magnetically biased in the same general radial direction at all times so that the rotor supporting shaft portion of the device will not shift with respect to its support bearings. Accordingly, such an arrangement eliminates impact forces which cause noise and bearing wear.

Other concepts of the present invention relate to improvements in the operative relationship of the rotor, field electromagnets and speed indicating mechanism of speedometers; improved means for calibrating speed indicating mechanism; improved means for dampening oscillations in a pointer element of speed indicating mechanism; and an improved sender or switch for sequentially energizing field electromagnets. These concepts are more particularly set forth in the detailed specification which follows.

Important objects of this invention, therefore, are to improve the operation of electric speedometers of the type including a rotor and a stator having field electromagnets which are sequentially energized to produce a synchronous type pulse motor action between the rotor and field magnets; to improve such operation by so grouping such field magnets within an arcuate portion on the periphery of the rotor which is less than 180° so that the rotor will not reverse its direction of rotation; and to improve such operation by permanently magnetizing the rotor of such a speedometer and locating a speed indicating element in operative relationship with the rotor at a point isolated from the influence of the varying fields produced by the field magnets.

Further objects of the invention are to improve the operation of speedometers having a plurality of field electromagnets in operative relationship with a permanently magnetized rotor by locating a plurality of permanent poles in the outer surface of the rotor in a chordal fashion to define a plurality of chordal magnetic circuits adjacent the outer periphery thereof; to improve the operation of such meters by locating a plurality of permanent poles in the upper and lower surface of the rotor to define a plurality of axially aligned magnetic circuits; to improve the operation of a meter having such axially aligned magnetic circuits by further including a plurality of permanent poles on the bottom surface of the rotor adjacent the inner periphery thereof to define a plurality of chordal magnetic circuits; to improve the operation of such meters, including a permanently magnetized ring rotor, by locating a plurality of permanent poles on the inner and outer peripheral surfaces of the ring rotor to define a plurality of radially aligned magnetic circuits; to improve the operation of meters having such a ring rotor by locating a first plurality of permanent poles at the outer periphery thereof adjacent the top surface thereof to define a first plurality of chordal magnetic circuits and by locating a second plurality of permanent poles in the bottom surface thereof to define a second plurality of chordal magnetic circuits; and to improve the operation of meters having such a ring rotor by locating a first plurality of permanent poles on the inner periphery of the ring rotor to define a first plurality of chordal magnetic circuits and by locating a second plurality of permanent poles of the outer periphery of the ring rotor to define a second plurality of chordal magnetic circuits.

Further objects of the invention are to reduce bearing wear in electric metering devices of the aforementioned type, and to reduce such bearing wear by grouping the field electromagnets unsymmetrically with respect to the rotor so as to magnetically bias a rotor-carrying shaft in one direction at all times.

Further objects of the invention are to arrange the rotor, energizing field electromagnets and non-magnetic conductive speed indicating portions of such speedometers in a compact manner.

Still further objects of the invention are to improve means for smoothing out irregularities in the movement of such rotors, and to smooth out such irregularities transmitted from such rotors to the speed indicating portion of such a device.

Still further objects of the invention are to calibrate speed indicating mechanism without affecting the drive torque of the rotor portion of a speedometer and to calibrate speed indicating mechanism in such a manner by means which varies the air gap between the rotor and a non-magnetic, conductive element of such speed indicating mechanism.

Still further objects of the invention are to improve a sender which sequentially energizes the field magnets of such electric metering devices; and to improve such a sender by mounting a plurality of contactor brushes which are adapted to be electrically connected to a suitable source of power in contacting relationship with a rotatable contact plate having a first plurality of segmental surfaces which connect the source of power to ground causing current to sequentially pass through the field electromagnets of the metering device and a second plurality of segmental surfaces which sequentially interrupt the flow of current to such field magnets with the first and second plurality of segmental surfaces defining a continuous, level contacting surface of a uniform characteristic which reduces contactor brush wear.

Further objects, features and advantages of this invention will become apparent from a consideration of the following description, the appended claims and the accompanying drawing in which:

FIGURE 1 is a view in elevation of the rear of a receiver constructed in accordance with certain principles of the invention;

FIG. 2 is an enlarged view in vertical section taken along the line 2—2 of FIGURE 1;

FIG. 3 is a view in elevation of the top of the receiver illustrated in FIGS. 1 and 2;

FIG. 4 is a view in elevation of the front of the receiver illustrated in FIGS. 1–3;

FIG. 5 is a plan view of the magnetized rotor portion of the receiver of FIGS. 1–4;

FIG. 6 is a view in elevation of a sender constructed in accordance with certain of the aspects of the present invention;

FIG. 7 is a view in vertical section taken along the line 7—7 of FIG. 6;

FIG. 8 is a view in elevation of the contact plate of the sender illustrated in FIGS. 6 and 7;

FIG. 9 is an enlarged view in vertical section taken along the line 9—9 of FIG. 8;

FIG. 10 is an enlarged view in vertical section taken along the line 10—10 of FIG. 8;

FIG. 11 is a diagrammatic view of another embodiment of a receiver constructed in accordance with certain of the principles of the invention;

FIG. 12 is a diagrammatic view of the magnetized rotor and field magnets of the receiver illustrated in FIG. 11;

FIG. 13 is a diagrammatic view of another modification of a receiver constructed in accordance with certain aspects of the present invention;

FIG. 14 is a diagrammatic view of the magnetized rotor and field magnets of the receiver illustrated in FIG. 13;

FIG. 15 is a diagrammatic view of another modification of a receiver constructed in accordance with certain of the principles of the present invention;

FIG. 16 is a diagrammatic view of the magnetized rotor and field magnets of the receiver illustrated in FIG. 15;

FIG. 17 is a diagrammatic view of another modification of a receiver constructed in accordance with certain of the principles of the present invention;

FIG. 18 is a diagrammatic view of the magnetized rotor and field magnets of the receiver illustrated in FIG. 17;

FIG. 18A is a view in vertical section taken along the line 18A—18A of FIG. 18;

FIG. 19 is a diagrammatic view of a further modification of a receiver constructed in accordance with certain principles of the present invention;

FIG. 20 is a diagrammatic view of the magnetized rotor and field magnets of the receiver illustrated in FIG. 19;

FIG. 21 is a diagrammatic view of still another modification of a receiver constructed in accordance with further principles of the present invention;

FIG. 22 is a diagrammatic view of the magnetized rotor and field magnets of the receiver illustrated in FIG. 21;

FIG. 23 is a diagrammatic view of another modification of a receiver constructed in accordance with certain other principles of the present invention;

FIG. 24 is a view in horizontal section taken along the line 24—24 of FIG. 23 with the speed cup portion of the receiver removed;

FIG. 25 is a diagrammatic view of the magnetized rotor of the receiver illustrated in FIGS. 23 and 24;

FIG. 26 is a diagrammatic view of another modification of a receiver constructed in accordance with certain other of the principles of the present invention;

FIG. 27 is a view in side elevation of the receiver illustrated in FIG. 26;

FIG. 28 is a diagrammatic view of still another modification of a receiver constructed in accordance with certain of the principles of the present invention;

FIG. 29 is a view in vertical section taken along the line 29—29 of FIG. 28;

FIG. 30 is a diagrammatic view of speed indicator mechanism constructed in accordance with certain other of the principles of the present invention; and FIG. 31 is a diagrammatic view of another modification of speed indicator mechanism constructed in accordance with certain of the principles of the invention.

Referring now to the drawings, one embodiment of an electric speedometer constructed in accordance with certain of the principles of the present invention includes a receiver 10, illustrated in FIGURES 1–5, and a sender 12 illustrated in FIGURES 6–10. The sender 12 is electrically connected to a suitable source of energy such as a battery 11 through an ignition switch 11a of a vehicle and is adapted to introduce electrical impulses into an output circuit 13 including the receiver 10 which is preferably mounted remotely from the sender 12, as for example, on the instrument panel of an automobile in a position observable to the driver of the vehicle.

The sender 12 comprises a shell portion 15 defining a housing for a circular contact plate 14 (FIG. 7) connected to a shaft 16 by means of a retaining element 17 which press-fits into one end of the shaft 16. The opposite end of the shaft 16 is directed outwardly of the shell 15 and through an aperture 18 in a bushing 20. An adapter element 22 connected to an end wall portion 24 of the shell 15 supports the bushing 20 and shaft 16 at a predetermined location relative to the shell 15. Means including a bracket 25 connected to the adapter element 22 secure the sender 12 to the frame of an automobile or the like. The contact plate 14 is located inwardly of the wall portion 24 by a sleeve 26 carried on an inner, small diameter portion 28 of the shaft 16.

An annular seal 32 of resilient material press-fits between the adapter element 22 and the shaft 16 to prevent the entrance of dirt and the like along the outer periphery of the shaft 16 to a point inside of the shell 15. The end of the shell 15 opposite the wall 24 is closed by a cover 34 having a stepped inner surface which defines an axially inwardly directed flange 36 that engages the inner surface of the shell 15. A channel 38 on the open end of the shell 15 receives the outer periphery of the cover 34 and inwardly directed flange portions 40 which define one side of the channel 38 engage the outer surface of the cover 34 for holding it in place on the shell 15. A gasket 42 of suitable resilient material fits between the cover 34 and the inner surface of the channel 38 to prevent the entrance of dirt and the like along the outer periphery of the cover 34 into the shell 15.

The circular contact plate 14 includes a central disc portion 44 of electrical insulating material which has a plurality of equally spaced radial grooves 46 formed in the outer periphery thereof (FIG. 10). A layer of conductive material 47, for example, copper, covers one face of the central disc 44 with its center portion being juxtapositioned between the central disc 44 and the sleeve 26. The opposite face of the disc 44 carries a first and second plurality of segmented plates 48, 50 of conductive material, for example, copper. The first plurality of segmented plates 48, representatively illustrated as three in number, extend to the center of the disc 44 to contact the small diameter portion 28 of the shaft 16 which serves to sequentially ground a plurality of contactor brushes 52, representatively illustrated as three in number (FIG. 8), as the shaft 16 is driven by a rotatable portion of the vehicle such as a gear in its transmission, a wheel, or its drive shaft, through a gear 54 connected to the outboard end of the shaft 16.

The second plurality of segmented plates 50 are electrically insulated from the plates 48 and from all other portions of the sender 12 by means including the disc 44 and gaps 63 between the plates 48 and 50. Therefore, when a contactor brush 52 is only in contact with one of the plates 50 it will no longer conduct current. Each of the plates 50 are representatively illustrated as extending through an arc of 60° and each of the plates 48 as extending through an arc which is slightly less than 60° as determined by the gaps 63. The brushes 52 are spaced approximately 80° apart and thereby coact with the segmental plates 48, 50 so as to produce a sequential energization of the receiver 10 in a manner to be discussed.

Each one of the contactor brushes 52 is carried in a recess 56 formed in a brush holder 58 on the inner surface of the cover 34. The brushes 52 are biased into contact with the spaced plates 48, 50 on the contactor plate 14 by means of compression springs 60 in the recesses 56 which contact the outer ends of the brushes 52 to press them inwardly toward the contact plate 14. Grounding of the brushes 52 is partially provided by the shaft 16 but is assured by a grounding spring 62 mounted between the end wall 24 of the shell 15 and the copper layer 47 on the rear surface of the central disc 44.

The plates 50 provide a level surface of uniform material on the inner face of the contact plate 14 so that the contactor brushes 52 will not be adversely affected by contacting different types of material during the operation of the sender or encounter surface discontinuities as they engage different portions of the inner face of the contact plate 14. The radial slots 46 in the central disc portion 44 prevent surface bridging of conductive material between the conductive surface plates 48 and the conductive but insulated surface plates 50 which might otherwise occur as the contact surface of the plate 14 wears.

The sender 12 is operatively associated with the output circuit 13 by means of a plurality of conductors 66 which extend outwardly of the cover 34 and are electrically grounded by the contactor brushes 52. An arcuate segment of suitable insulating material 68 seals apertures 70 in the cover 34 through which the conductors 66 extend. Each of the conductors 66 electrically connects to one of a plurality of field windings or coil portions 72a, 72b and 72c of the receiver 10 which are in turn electrically connected through the switch 11a to the battery 11. Rotation of the contact plate 14 sequentially energizes the coils 72a, 72b and 72c to actuate the receiver 10 in a manner to be discussed.

One embodiment of an improved receiver 10 constructed in accordance with certain of the principles of the present invention is illustrated in FIGURES 1–5 as including a base plate 74 having a U-shaped frame 76 mounted thereon and a supporting bridge 78 on the frame 76 which stabilizes an indicating mechanism 80 at the front and upper end of the frame 76. Such a mechanism is adapted to indicate the number of revolutions of a shaft 82 in a manner to be discussed.

The shaft 82 is supported for rotation relative to the frame 76 and base 74 by means including first and second small diameter portions 84, 86 on its opposite ends which are journaled in bearings 88, 89, respectively, located in the top of the frame 76 and in the base 74, respectively.

A rotor 90, representatively illustrated as being ring-shaped, is secured adjacent one end of the shaft 82 by compensator means 92 including a radially inwardly located axially directed flange portion 94 connected to the shaft 82 and a plurality of equally spaced radially outwardly directed arms 96 which carry the rotor 90. The rotor 90 is constructed of barium ferrite or other suitable material having a "high coercive force." For purposes of this specification, a "high coercive force" material is one which is difficult to magnetize, but once magnetized, is difficult to demagnetize.

In the embodiment of FIGURES 1–5, the rotor 90 has a plurality of equally spaced permanent north and south poles, $N_1$-$S_1$ through $N_4$-$S_4$, in the outer periphery thereof, which define a plurality of magnetic circuits 100, respresentatively illustrated as eight in number. Each of the north and south poles are accordingly spaced 45° apart. A straight line which interconnects the north and south poles of each circuit 100 is a chord line of a circle drawn through such poles. For purposes of this specification, such magnetic circuits shall be referred to as "chordal magnetic circuits" it being understood that substantially all of the flux lines from the chordal magnetic circuits 100 lie substantially in the same plane as the rotor 90.

The shaft 82 is rotated when a plurality, representatively shown as three in number, of field electromagnets 104a, 104b and 104c, which include field windings 72a, 72b, 72c, are sequentially energized to produce fields of varying strength which react with the magnetic circuits 100 to drive the rotor as a synchronous type pulse motor. The field magnets 104a–c are representatively illustrated as being equally spaced within a 60° arcuate portion of the ring rotor 90. The cores of the field magnets 104a–c are defined by inwardly directed arms or cores 110a, 110b and 110c of a stator segment 106 which connects to the base plate 74 of the receiver 10 adjacent the outer periphery of the ring rotor 90. The stator segment 106 serves as a return pole piece for the electromagnetically produced flux in a manner to be discussed. The radially innermost end of each core 110a, 110b and 110c is located adjacent the outer peripheral edge of the rotor 90 in spaced relationship therewith. The coils 72a, 72b and 72c of the output circuit 13 are wound about the core portions 110a–c, respectively, and are electrically connected to suitable terminals 109 adapted to be electrically connected to the sender 12. In this arrangement each of the coils is wound in the same manner so that the same relative polarization occurs in each of the cores 110a, 110b and 110c when the coils are energized. As best shown in FIGURES 2 and 3, the coils 72a, 72b and 72c are shunted with conventional anti-spark resistors 111.

The synchronous motor action of the receiver 10 occurs in the following manner. First, the relationship between the segmented plates 48, 50 on the contact plate 14 of the sender 12 and the brushes 52 is such that the coils 72a, 72b and 72c are sequentially energized in the sequence 72a, 72a–72b, 72b, 72b–72c, 72c, 72c–72a, etc. For example, referring to FIGURE 8, it can be seen that initially the coil 72b will be the only energized coil since the only brush 52 which contacts a grounding plate 48 is that which connects to coil 72b. Clockwise rotation of the contact plate 14 will cause the segmented plates 48 to ground the brushes 52 which connect to the coils 72b–72c. Still further, clockwise rotation of the contact plate 14 will cause the segmented plates 14 to move such that only the coil 72c will be energized. Such a sequential energization of the coil 72a, 72b and 72c will cause the cores 110a, 110b and 110c of the electromagnets 104a, 104b and 104c to become magnetized in a corresponding sequence. It is assumed that each of the coils 72a, 72b and 72c are wound in a manner such that the cores 110a, 110b and 110c will have a north pole at their radially innermost end when the corresponding field electromagnet is energized.

Referring now to FIGURE 5 and assuming that the contact plate 14 and brushes 52 are arranged so that the coil 72a is the only coil initially energized. In this case the core 110a has a north pole at its radially innermost end. Electromagnetically produced flux passes from the radially innermost end of the core 110a through the rotor 90, and thence through the radially innermost end of the unenergized core 110b to return through the stator segment 106 which serves as a return pole piece. The north pole of the electromagnet 104a will cause the rotor 90 to move in a counterclockwise direction since it will repel the pole $N_1$ on the rotor 90 and attract the pole $S_1$ thereon into a position adjacent thereto. This locates the pole $N_1$ between the electromagnets 104b and 104c.

Further rotation of the contact plate 14 of the sender 12 will energize both the electromagnets 104a and 104b to produce a north pole at the radially innermost end of the cores 110a and 110b, respectively. The electromagnetically produced flux from the electromagnets 104a and 104b will pass through the rotor 90 and return through the stator segment 106 and the pole portions of the energized electromagnets 104a and 104b to coact with the poles on the rotor 90 as follows. The pole $N_1$ will be repelled in a counterclockwise direction by the north pole of the electromagnet 104b which also attracts the pole $S_1$. Further rotation of the contact plate 14 will energize the electromagnet 104b and deenergize the electromagnets 104a and 104c. Accordingly, the pole $S_1$ is attracted to a point adjacent the north pole of the magnet 104b and the pole $N_1$ is located counterclockwise of the magnet 104c. Thus, when the electromagnets 104b and 104c are energized the pole $N_1$ is repelled by the magnet 104c and the pole $S_1$ is attracted thereto. A similar counterclockwise torque is imposed on the rotor 90 throughout the remaining steps of the sequence of coil energization mentioned above. The energized coil or coils will induce poles in the core portions associated with the deenergized coil or coils which are of an opposite polarity to those present in the core portions of the energized coil or coils. Such a mutual coupling between the energized and deenergized field electromagnets is not deleterious.

Thus, in this arrangement the sequential energization of the coils 72a, 72b and 72c will, as discussed, produce a step-wise advancing field of flux within a 60° arcuate portion on the periphery of the rotor 90 which interacts with the chordal magnetic circuits 100 to cause it to move in synchronism with the advancing stator field. In practice, the starting may be considered instantaneous, i.e., the rotor 90 synchronizes immediately with the step-wise advancing field of flux produced by the sequential electrical impulses from the sender 12.

The illustrative arrangement of eight permanent north and south poles on the magnetized rotor 90 and three field electromagnets 104 located within a 60° arcuate portion of the rotor 90, therefore, is merely representative, it being understood that satisfactory results may be obtained with other arrangements (numerical and angular) of field magnets and rotor poles so long as no more than a single rotor pole is aligned with any one of the stator poles at one time. If two or more rotor poles are simultaneously aligned with two or more stator poles, the rotor will tend to lock in that position. Furthermore, the total arc encompassed by the electromagnet grouping must be greater than the arc between any two adjacent rotor poles in order that an energized electromagnet will be operatively located with respect to a rotor pole at all times.

The unsymmetrically arranged field electromagnets 104a–c will always attract the rotor 90 in one direction (to the left, as illustrated in FIGURE 2) so that the small diameter portions 84, 86 on the shaft 82 will always bear against one arcuate portion of the inner periphery of the bearings 88, 89 rather than shift laterally along the inner periphery of such bearings as would occur if the field magnets were equally spaced around the rotor periphery. This eliminates impact forces between the shaft 82 and its bearings 88, 89 which would otherwise produce substantial noise and bearing wear.

A further advantage of the unsymmetrically located field electromagnets is that they may be located a substantial distance from a speed indicator mechanism so that the electromagnetically produced flux will not significantly influence the operation of the speed indicator mechanism. For example, in the embodiment of FIGURES 1–5, the field electromagnets 104a, 104b and 104c and the speed indicator mechanism 80 are located on diametrically opposite sides of the rotor 90.

The indicator 80 comprises odometer and speedometer mechanisms. The odometer mechanism is of a conventional type comprising a plurality of drums 112 driven by a gear train from the shaft 82. The gear train comprises a worm 114 on the upper end of the shaft 82 driving in succession a gear 116 connected on one end of a cross shaft 118 which extends transversely to and is supported by the frame 76, a worm 120 on the opposite end of the shaft 118, a reduction gear 122 connected to a shaft 124 mounted on the frame 76, a pinion 126 at the opposite end of the shaft 124, a second reduction gear 128 mounted on a shaft 130 carried on the frame 76 and a pinion 132 mounted on one end of a shaft 134 supporting the drums 112.

The speed indicator mechanism is of the eddy current type including a disc 136 of non-magnetic conductive material such as aluminum mounted on a staff 138 which has one end supported in a recess 140 in the end of an externally threaded screw 142 which is adjustably threaded in a supporting bridge portion 144 on the frame 76. A small diameter opposite end portion of the staff 138 is rotatably journaled in an externally threaded screw 146 by means of a bearing 148 supported in a counterbore portion 150 of the screw 146. The externally threaded screw 146 is supported in threaded engagement with the forwardly located bridge 78 on the frame 76. A pointer 151 is secured on the end of the small diameter portion of the staff 138. Between the pointer 151 and the bracket 78, a bushing 152, supporting the inside end of a spiral hairspring 154, is press-fitted on the staff 138. An adjusting lever 156 which supports the outside end of the spiral hairspring 154 has a center hub portion which threadingly engages the externally threaded screw 146. Rotation of the lever 156 regulates the action of the hairspring 154.

A radially outer portion of the disc 136 is tangent to the outer periphery of the ring rotor 90 where it intersects the flux lines of the chordal magnetic circuits 100. Eddy currents are induced in the disc 136 as the magnetized ring rotor 90 moves relative thereto. The interaction of the magnetic fields caused by the eddy currents in the disc 136 and the chordal magnetic circuits 100 on the rotor 90 produces a torque upon the disc 136. This causes rotation of the disc 136 and the development of a counter-torque from the hairspring 154 that restrains the disc 136 from rotating so that it assumes a position of equilibrium depending upon the speed of rotation of the rotating chordal magnetic circuits 100. Rotation of the disc 136 causes the staff 138 to turn the pointer 151 to reflect the rotative speed of the rotor 90. A suitably marked scale (not shown) may be positioned relative to the pointer 151 so that the speed can be directly ascertained. The hairspring 154 acts as a zeroing spring when the magnetized ring rotor 90 is not rotating to return the pointer 151 to a preselected position where a stop tab 155 on the disc 136 rests on a suitable fixed support such as one side of a steel flux collector 158 which is pivotally mounted by means of a pin 159 to a leg portion 160 turned upwardly from the base plate 74 outwardly of the disc 136. The flux collector 158 has a surface 161 thereon which slopes relative to the periphery of the rotor 90 to define a return path for the flux from the chordal magnetic circuits 110 which intersect the disc 136.

Prior speedometers were calibrated by demagnetizing a rotor such as rotor 90 to reduce the magnetic coupling effect between the rotor and a nonmagnetic conductive speed element. This is undesirable since it reduces the odometer driving torque of the rotor. Accordingly, another aspect of the invention contemplates calibrating a speedometer without affecting the torque of an odometer driving rotor. In the embodiment of FIGURES 1–5, such calibration is produced by means of the flux collector 158 which is pivoted to move a greater or lesser portion of the sloping surface 161 thereof into intersecting relationship with the chordal magnetic circuits 100 to vary the number of flux lines passing through the disc 136. This in turn varies the magnetic coupling effect between the rotor 90 and disc 136 to produce the desired calibration.

Since the rotor 90 is driven in a step-wise fashion there will be some tendency for the pointer 151 to oscillate or waver. Therefore, a dampening weight 162 is carried on a radially outwardly directed flange portion 164 of a sleeve 166 which connects to the rotating shaft 82. The weight 162 is free to rotate on the sleeve 166 so that an acceleration or deceleration of the magnetized rotor 90 caused by its step-wise advance will produce slipping between the weight 162 and the sleeve 166 to produce a frictional dampening effect therebetween. Such dampening causes a substantially uniform advance of the rotor 90 so that the disc 136 will in turn be driven in a uniform manner to maintain the pointer 151 in a substantially constant position for a given rotative speed.

It should be understood, of course, that the concept of unsymmetrically arranged field electromagnets is equally suited for use in an odometer structure or the like which is driven by a synchronous motor-type interaction between field electromagnets and radial projections on a soft iron rotor which is not permanently magnetized. A permanently magnetized rotor is preferred in the device, illustrated in FIGURES 1–5, since it is equally well suited for driving a speed indicating mechanism.

Referring now to the remaining embodiments of the invention relating to the general combination of a rotor, field electromagnets and speed indicator mechanism; in each of these embodiments the field electromagnets are sequentially energized by a sender such as that illustrated in FIGURES 6–10. It should also be understood that in each embodiment the electromagnetically produced flux returns through a stator segment similar to stator 106 in FIGURES 1–5 to define field pole pieces which interact with the rotor to produce the synchronous pulse-motor action already discussed in detail in the embodiment of FIGURES 1–5. Accordingly, the details of operation of each of the subsequent embodiments will be omitted, it being understood that they all operate as discussed in FIGURES 1–5. It should also be understood that each of the following embodiments may be combined with odometer structure such as that illustrated in FIGURES 1–5.

The embodiment of the invention illustrated in FIGURES 11 and 12 includes a magnestized ring-shaped rotor 170, a plurality of field electromagnets 172 and a speed disc 174 of non-magnetic, conductive material such as aluminum, arranged in accordance with certain aspects of the invention in a highly compact manner. The plurality of field magnets 172, illustrated as three in number, are located within an arcuate portion of the rotor 170 which is substantially less than 180°, representatively illustrated as being 120°. The face of each core 176 of the magnets 172 is in spaced parallelism with a sloping surface 178 on the outer periphery of the rotor 170. The field magnets 172 are sequentially energized as previously discussed, to provide a step-wise advancing field of force along the outer periphery of the magnetized rotor 170. A plurality of equally spaced permanent north and south poles on the sloping surface 178 interact to form a plurality of chordal magnetic circuits 180, representatively illustrated as being eight in number. The interaction of the field magnets 172 and the chordal magnetic circuits 180 rotates the magnetized rotor 170 which is supported by means of a shaft 182 journaled in bearings 184, 186 on either end thereof.

The rotating chordal magnetic circuits 180 intersect a radially outer portion of the disc 174 which is tangent to and in spaced parallelism with the sloped surface 178 on the rotor 170 at a location remote from the influence of the varying fields of the field magnets 172. When the disc 174 is in this position, the angular relationship between the disc 174 and the rotor 170 is acute and thus produces a highly compact receiver arrangement.

As the rotating magnetic field produced by the chordal magnetic circuits 180 intersects the radially outer portion of the disc 174 and return through a flux collector 187, a torque is produced on the disc 174 as was previously discussed to move a speed indicator mechanism which is a counterpart of that illustrated in the embodiment of FIGURES 1-5 and as such comprises a rotatable staff portion 188, a countertorque producing hairspring 190 and a speed indicating pointer 192 which are interrelated and function in the same manner as their counterpart elements illustrated in the embodiment of FIGURES 1-5.

A further embodiment of a receiver constructed in accordance with certain other of the principles of the present invention is illustrated in FIGURES 13 and 14 as including a magnetized ring-shaped rotor 196, a plurality of field magnets 198 and a speed indicating mechanism 201 having a speed disc 200 of non-magnetic, conductive material. The field magnets 198 are located within an arcuate portion of the rotor 196, representatively illustrated as 120°. As was the case in the previous embodiments the magnetized rotor 196 is connected to a driven shaft 204 which is rotatably journaled in bearings 206, 208. The driven shaft 204 may be adapted to operatively connect with a conventional odometer assembly as previously described. In this embodiment the magnetized ring rotor 196 has a first and second plurality of north and south poles in its top and bottom surfaces, respectively. The first and second plurality of poles on the top and bottom surface of the rotor 196 are axially aligned to form a plurality of magnetic circuits 210. A straight line between the north and south pole of each magnetic circuit 210 is in spaced parallelism with the axis of the rotor 196 as defined by the shaft 204. For purposes of this specification such magnetic circuits shall be referred to as "axially aligned magnetic circuits." Each of the axially aligned magnetic circuits 210 are magnetically isolated from one another due to the fact that the ring rotor 196 is of a high coercive material such as barium ferrite or the like.

In order to produce the previously described synchronous type motor action between the rotor 196 and the field magnets 198, the field magnets of this embodiment are modified to include a U-shaped core 212 with the arms 214, 216 of the U passing above and below the top and bottom surfaces of the rotor 196, respectively. The arms 214, 216 are interconnected by a bight portion 218 having a coil 220 wound thereon which is sequentially energized by a sender such as that illustrated in FIGURES 6-10. Such energization produces opposite polarization in the arms 214, 216 and a step-wise advancing field of force adjacent the periphery of the magnetized rotor 196 which interacts with the axially aligned magnetic circuits 210 on the periphery of the rotor to produce the desired synchronous motor action.

The rotating axially aligned magnetic fields 210 are also intersected by a radially outer portion of the speed disc 200 which is tangent to the periphery of the rotor 196 for actuating the speed indicator mechanism 201 which is a counterpart of such mechanisms previously described. The disc portion 200 of the speed indicating mechanism 201 of this embodiment is also located at a point isolated from the varying fields produced by the field magnets 198 in a manner similar to that described in the previous embodiments.

The embodiment of the receiver illustrated in FIGURES 15 and 16 includes a magnetized ring-shaped rotor 222, a speed disc portion 224 of a speed indicator mechanism 225, and a plurality of field magnets 226 all of which are the counterparts of similar elements illustrated in the embodiment of FIGURES 13 and 14. In this embodiment, however, the magnetized rotor 222 has a first plurality of equally spaced permanent north and south poles on its inner periphery and a second plurality of equally spaced permanent north and south poles on its outer periphery. The first and second plurality of poles are radially aligned to form a plurality of magnetic circuits 228. A straight line between the north and south pole of each circuit 228 is colinear with a radius line from the axis of the magnetized rotor 222 as defined by a shaft 230 connected thereto and rotatably journaled in bearings 232, 234 on either end thereof. For purposes of this specification such magnetic circuits shall be defined as "radially directed magnetic circuits."

In order to produce the above described synchronous type motor action each field magnet 226 has a U-shaped core 236, with the arms 238, 240 of the U passing over the inner and outer peripheral surfaces of the rotor 222, respectively. A coil 242 is wound on a bight portion 244 interconnecting the arms 238, 240 to produce opposite polarization in the arms 238, 240 when it is sequentially energized by a suitable sender. As was the case in the previous embodiments, an advancing field of force produced by the field magnets 226 interacts with the radially directed magnetic circuits 228 to advance the rotor 222 in a step-wise fashion relative to a radially outer portion of the speed disc 224. The speed indicator mechanism 225 is then actuated in a manner similar to such mechanisms as previously discussed.

The embodiment of the invention illustrated in FIGURES 17 and 18 includes a magnetized rotor 246 which is connected to a rotatably journaled shaft 248. In this embodiment the magnetized rotor 246 has a first plurality of equally spaced permanent north and south poles formed in its outer periphery adjacent the top surface thereof and a second plurality of permanent magnetized poles formed in its bottom surface. The first plurality of poles interacting to define a first plurality of chordal magnetic circuits 250 in a horizontal plane adjacent the upper surface of the rotor 246 and the second plurality of poles interact to define a second plurality of chordal magnetic circuits 251 in vertical planes through chord lines connecting the north and south poles thereof. A plurality of field electromagnets 252 are located below the rotor 246 within an arcuate portion representatively illustrated as 120°. Such magnets provide a step-wise advancing field of force in a manner already discussed, which interacts with the magnetic circuits 251 to synchronously drive the rotor 246 in a step-wise fashion. The non-magnetic disc portion of a speed indicator mechanism 254 is modified in this embodiment to include a cup-shaped element 256 having an axially directed flange portion 258 located radially outwardly of the outer periphery of the rotor 246 in surrounding relationship therewith to interact with the first plurality of chordal magnetic circuits 250 as they advance in a step-wise fashion relative thereto.

The cup-shaped element 256 connects to a staff 260 having one end rotatably journaled at a bearing point 262 on the upper end of the shaft 248. The opposite end of the staff 260 projects through and is rotatably journaled in a supporting bridge 264. The magnetic circuits 250 interact with the cup-shaped element 256 to cause the staff 260 to rotate a predetermined degree against the return force of a hairspring 266 connected between the bridge 264 and the staff 260 so a pointer 268 on the end of the staff 260 will assume a position of equilibrium depending on the speed of rotation of the rotor 246. In this embodiment the variable fields of force produced by the field magnets 252 are again located a substantial distance from the speed cup 256 so that they will not interfere with the operation of the speed indicator mechanism 254.

Another embodiment of the receiver illustrated in FIGURES 19 and 20, includes a magnetized ring rotor 270 having a first plurality of equally spaced permanent north and south poles at its outer periphery and a second plurality of equally spaced permanent north and south poles at its inner periphery which are magnetically isolated from the first plurality of permanent north and south poles. The first plurality of poles interact to form a first plurality of chordal magnetic circuits 272 along the outer periphery of the rotor 270. Similarly, the second plurality of equally spaced permanent poles on the inner periphery of the rotor 270 interact to form a second plurality of chordal magnetic circuits 274 along the inner periphery thereof. The magnetic circuits 272 on the outer periphery of the rotor 270 interact with a step-wise advancing field of force within an arcuate portion of the ring rotor 270 substantially less than 180° produced by a plurality of field electromagnets 276 each of which has a core with an axially directed leg portion 278 spaced radially outwardly of the outer periphery of the rotor 270 which connects with a transverse core portion 280 having a coil 282 wound thereon, with the several coils being sequentially energized by a sender in a manner already discussed. Each of the field electromagnets are carried on an arcuate stator element 283 which serves as a return pole piece for the electromagnetically produced flux.

The rotor 270 connects to a shaft 284 which is rotatably journaled in bearings 286, 288 to support the rotor 270 during its step-wise rotation. The speed of the rotor 270 is indicated by a speed indicator mechanism 289 including a cup-shaped element 290 of non-magnetic conductive material, for example, aluminum, connected to a staff 292 which is rotatably journaled at one end in a bearing 294 in a supporting bridge 296 and at its opposite end in a bearing point 298 in a steel flux collector 300 having an axially directed peripheral flange portion 302 located radially inwardly of the inner periphery of the rotor 270.

The speed cup 290 has an axially directed peripheral flange portion 304 which is located between the flange 302 on the flux collector 300 and the inner periphery of the rotor 270 to interact with the step-wise advancing chordal magnetic circuits 274 to produce a torque on the speed cup 290 which is counterbalanced by the force of a hairspring 306 which connects to the staff 292 and the bridge 296 so that a pointer 308 on the outer end of the staff 292 assumes a position of equilibrium depending on the speed of rotation of the rotor 270. In this embodiment, the varying fields of force produced by the field magnets 276 are located so as not to interfere with the interaction between the non-conductive speed cup 290 and the chordal magnetic circuits 274 on the inner periphery of the rotor 270.

Another embodiment of the receiver shown in FIGURES 21 and 22 includes a ring-shaped magnetized rotor 310 having a sloping surface 312 on its bottom surface adjacent the inner periphery thereof. The rotor 310 connects to a shaft 314 which is rotatably journaled in bearings 316, 318 for supporting the magnetized rotor 310 as it advances in a step-wise fashion as already discussed. The magnetized rotor 310 has a plurality of equally spaced permanent north and south poles in its upper surface at the outer periphery thereof and a second plurality of equally spaced permanent north and south poles in its bottom surface at the outer periphery thereof. The first and second plurality of north and south poles interact to form a plurality of equally spaced axially directed magnetic circuits 320 which interact with an advancing field of force along an arcuate portion of the rotor 310 representatively illustrated as 120°, produced by a plurality of field electromagnets 322, illustrated as three in number, each having a core comprising arm portions 324, 326 located in spaced parallelism above and below the top and bottom surface of the rotor 310, respectively, in intersecting relationship with the axially aligned magnetic circuits 320. The arm portions 324, 326 are interconnected by a bight portion 328 which has a coil 330 wound thereon, with the several coils being sequentially energized by a sender as already discussed.

In this embodiment, the speed indicator mechanism 331 includes a dished speed element 332 which has an angularly directed peripheral flange portion 334 which is in spaced parallelism with the sloping surface 312 on the bottom surface of the rotor 310. A plurality of equally spaced permanent north and south poles are formed on the sloping surface 312 interacting to define a plurality of chordally aligned magnetic circuits 336 along the inner periphery of the magnetized rotor 310. The dished speed element 332 is connected to a staff 338 which is rotatably journaled at one end in a supporting bridge 339 and at its opposite end in a supporting frame 340 directed axially inwardly of the bridge 339. One side of the element 332 is a layer 341 of steel which serves as a flux collector. Hence, the rotating magnetic circuits 336 intersect the dish element 332 to produce a torque thereon which is opposed by the force of a hairspring 344 connected to the staff 338 and the supporting bridge 339 so that a pointer 346 on the outer end of the staff 338 assumes a position of equilibrium depending on the rotative speed of the rotor 310.

In this embodiment as in the other arrangements, the dished speed element 332 is isolated from the influence of the varying fields of the field magnets 322 which are located within an arcuate portion of the rotor 310 substantially less than 180° in order to gain the advantages previously discussed.

A still further embodiment of the invention, illustrated in FIGURES 23–25, includes a magnetized ring rotor 350, a speed cup 352 of non-magnetic, conductive material such as aluminum and a plurality of field magnets 354 which are all combined to form an unusually compact receiver construction. The magnetized rotor 350 connects to a hollow shaft 355 which is rotatably journaled in suitable bearing means (not shown). A base 357 extends through the hollow shaft 355 to support the field magnets 354 adjacent the inner periphery of the rotor 350. A first and second plurality of equally spaced permanent north and south poles are formed on the inner and outer periphery of the rotor 350, respectively. The first plurality of poles interact to form a plurality of chordal magnetic circuits 356 on the inner periphery of the rotor 350 and the second plurality of permanent magnetic poles interact in a similar fashion to form a plurality of chordal magnetic circuits 358 on the outer periphery thereof. The first plurality of chordal magnetic circuits 356 interact with a step-wise advancing field of force produced by the field magnets 354 to drive the rotor 350 in a step-wise fashion.

The speed cup element 352 of a speed indicating mechanism 360 has an axially directed peripheral flange portion 362 which encloses the outer periphery of the magnetized rotor 350 to intersect the chordal magnetic circuits 358. A steel flux collector 364 is located radially outwardly of the axially directed flange portion 362 of the dished element 352 to provide a return path for the flux from the chordal magnetic circuits 358. The rotating magnetic circuits 358 ineract with the dish-shaped element 352 and impose a torque thereon in the manner previously discussed. The dish-shaped element 352 connects to a staff 366 which is rotatably journaled in bearing means similar to those illustrated in the previous embodiments to move a pointer 368 on the outer end of the staff 366 against the return force of a hairspring 370.

As was indicated in the discussion of the embodiment of FIGURES 1–5, the field electromagnets in speedometers may be arranged so that energized and deenergized coils will be electromagnetically coupled. One advantage of embodiments such as those illustrated in FIGURES 13 and 14, 15 and 16, and 21 and 22, is that the fields produced by the arms portions of the energized cores cancel one another to negate any electromagnetic interacting between the energized and deenergized electromagnets.

The embodiment of FIGURES 26 and 27 includes another field electromagnet arrangement 380 which negates such electromagnetic interaction. It includes a plurality of stacked arcuate cores 381, 382, 383 each of which has a pair of inwardly directed end projections 381a–381b, 382a–382b, 383a–383b, respectively, which terminate at points near but spaced from the outer periphery of a ring-shaped magnetized rotor 384. A plurality of equally spaced permanent north and south poles are formed on the upper surface of rotor 384 near the outer periphery thereof to form a plurality of chordal magnetic circuits 386, representatively shown as being twelve in number, which intersect the aforementioned core projections. The cores 381, 382, 383, are energized by means of coils 390, 392, 394 wound thereon which are adapted to sequentially carry electrical impulses from a sender such as that illustrated in FIGURES 6–10. Such a coil arrangement produces opposed north and south poles of relatively equal strength in the core projections of a given energized core. The fields produced by such poles cancel out so that no induced polarization occurs in the deenergized cores. Furthermore, such a field magnet arrangement provides substantially more drive torque for a given amount of current than in the previously discussed embodiments of the invention. The field of force produced by the cores 381, 383 also oscillates between an arcuate portion of the rotor 384 which is substantially less than 180° to assure that the interaction between the chordal magnetic circuits 386 and the poles formed on the core projections will produce the step-wise motor action previously described.

The rotor 384 is supported for such rotation by a shaft 396 having its ends rotatably journaled in suitable bearing means 398, 400. Such rotation advances the chordal magnetic circuits 386 into a driving relationship with a speed indicator mechanism 401 including a disc 402 of non-magnetic conductive material connected to a staff 404 which is rotatably journaled in bearings 406, 408 located on either end thereof. A radially outer portion of the disc 402 is tangent to the outer periphery of the magnetized rotor 384 to intersect with the chordal magnetic circuits 386 as the rotor 384 advances relative thereto. A disc-shaped flux collector 410 is mounted on the staff 404 coaxially with the disc 402 to provide a return path for the flux from the magnetic circuits 386. The rotating magnetic circuits 386, therefore, produce a torque on the non-magnetic disc 402 in the manner already discussed to move a pointer 412 on the outermost end of the staff 404 into a position of equilibrium maintained by the opposing torque of a hairspring 414 connected to the staff 404 and to a fixed reference point in a manner similar to the arrangments previously described.

Many of the previous embodiments illustrate a speed indicator mechanism having a non-conductive disc element located tangent to the magnetized rotor. Such a tangential driving relationship between the magnetized rotor and the non-magnetic speed disc portion of the indicating means is preferable in many instances since the magnetized rotor in such an arrangement includes chordal magnetic circuits such as those illustrated in the embodiments of FIGURES 1–5 and FIGURES 11 and 12, which are relatively easy to form making this type of an arrangement quite desirable. Such an arrangement, however, is inherently less compact than coaxially arranged non-conductive speed elements such as those illustrated in the embodiments of FIGURES 19–20 and FIGURES 21–22.

The embodiment of FIGURES 28 and 29 illustrates a highly compact receiver unit including a magnetized rotor 415 having a plurality of equally spaced permanent north and south poles in its upper surface which define a plurality of such relatively easy to form chordal magnetic circuits 416 on the periphery thereof. The rotor 415 is supported by suitable means including a shaft 419 rotatably journaled in suitable bearing means. A stator 417 has a plurality of field magnets 418 equally spaced within an arcuate portion of the rotor 415 substantially less than 180° which are sequentially energized when a coil 420 wound on a projecting core portion 422 of each of the field magnets 418 is connected to a source of energy by a sender as already discussed. Such sequential energization of the field magnets 418 produces a step-wise advancing field of force which interacts with the chordal magnetic circuits 416 for advancing the rotor in a step-wise fashion as already discussed.

To gain compactness and still retain the above described easily formed chordal magnetic circuits, this embodiment of the improved receiver includes a partial speed cup 424 which is a segment of a non-magnetic speed cup such as that illustrated in the embodiments of FIGURES 19–20. The partial speed cup 424 has an axially directed leg 426 located between the outer periphery of the rotor 415 and a flux collector 428 which provides a return path for the flux from the chordal magnetic circuits 416. The upper end of the axially directed leg 426 connects to the radially outer end of an arm 430 on the speed cup 424 which bends upwardly at its radially inner end to connect to a staff 432 located above the top surface of the rotor 415. The ends of the staff 432 are pivotally supported in suitable bearing means including a fixed bearing 434 so that the staff 432 rotates when a torque is imposed on the speed cup 424 because of the interaction of the rotating magnetic circuits 416 therewith. Such rotation is opposed by a countertorque produced by a spiral hairspring arrangement (not shown) equivalent to those previously disclosed. This embodiment of the invention represents an unusually compact receiver arrangement with the stator 417, field poles 418, rotor 415, non-magnetic partial speed cup 424 and flux collector 428, all lying substantially in the same plane.

As was pointed out in the operation of the embodiment illustrated in FIGURES 1–5, the rotor of a receiver constructed in accordance with certain of the principles of the present invention tends to accelerate and decelerate in a step-wise fashion because of the synchronous motor action of the magnetized rotor and field magnets. Such variations tend to produce a waver or oscillation in the pointer of the speed indicator mechanism. In the embodiment of FIGURES 1–5, such an effect is dampened by a weight 162 rotatably mounted on a sleeve 166 connected to the driven shaft portion 82 of that embodiment. A further arrangement for overcoming such oscillation is illustrated in FIGURE 30 as including a modified driving arrangement located between a speed disc and a pointer. The improved arrangement is adapted to be operatively associated with a synchronous motor arrangement similar to those in the other embodiments which include a plurality of field coils (not shown) and a magnetized rotor (not shown). The rotor of such a motor is driven relative to a non-magnetic speed disc 433 connected to a first staff 435 having end portions rotatably journaled in bearings 436, 438. Rotation of the disc 433 is opposed by the force of a spiral hairspring 440 connected between the staff 435 and suitable fixed support means. The drive oscillations transmitted from the speed disc 433 are eliminated by a second hairspring 444 which interconnects the first staff 435 and a rigid coupling element 446 adapted to transmit the dampened angular movement of the disc 433 through a sleeve 448 to an indicating pointer 447. The sleeve 448 interconnects the coupling element 446 and the pointer 447 and is rotatably mounted on a second staff 449. The first spiral hairspring 440 provides a zero-return and an equalizing torque and the second spiral hairspring 444 eliminates the tendency for the pointer 447 to waver during the step-wise advance of the magnetized rotor (not shown).

Another arrangement for overcoming such oscillations is illustrated in FIGURE 31 as including a speed indicator mechanism 451 having a pointer 452 and a non-magnetic speed disc 454 connected to a sleeve 456 which is rotatably mounted on a staff 458 having its ends rotatably journaled in support bearings 462, 463. The pointer 452 is suitably connected to an extension on one of the staff ends. A pin 464 directed outwardly from the speed disc 454 is coupled to the staff 458 by means of a first spiral hairspring 466 for dampening oscillations in the speed disc 454. A pin 468 is positioned diametrically opposite the pin 464 for counterbalancing the disc 454.

The disc 454 rotates the sleeve 456 on the staff 458 and a hairspring 470 which connects between a fixed frame supporting the bearing 463 and the pointer-carrying extension on the end of the staff 458 acts as a zero-return spring on the staff 458 and also produces a countertorque acting against the rotation of the disc 454 so that the pointer 452 will assume a position of equilibrium depending on the speed of rotation of the magnetized rotor (not shown) which drives the disc 454.

It will be understood that the specific constructions of the improved electric metering assemblies which are herein disclosed and described are presented for purposes of explanation and illustration, and are not intended to indicate limits of the invention, the scope of which is defined by the following claims.

What is claimed is:

1. In an electric speedometer, the combination of a magnetized rotor, stator means supported adjacent to and magnetically coupled with said rotor, said stator means including field electromagnets having windings thereon selectively energized for producing a step-wise advancing field of force which interacts with said magnetized rotor to cause relative rotation between said magnetized rotor and said stator means in response to said step-wise advancing field of flux, said relative rotation producing a rotating magnetic field, all of said field magnets being grouped within an arc which is substantially less than 180° to prevent reversals in the direction of rotation, spring retarded non-magnetic conductive speed-indicating means located in magnetic intersecting relationship with the rotating magnetic field produced by said magnetized rotor at a point which is isolated from the influence of the advancing field of force produced by said field magnets, and means operatively responsive to the rotation of said magnetized rotor for indicating its revolutions.

2. In an electric speedometer, the combination of a magnetized rotor, stator means supported adjacent to and magnetically coupled with said rotor, said stator means including field electromagnets having windings thereon selectively energized for producing a step-wise advancing field of flux which magnetically interacts with said magnetized rotor to cause relative rotation between said magnetized rotor and said stator means in response to said step-wise advancing field of flux, said relative rotation producing a rotating magnetic field, a shaft connected to said rotor, bearing means for rotatably supporting said shaft, all of said field electromagnets being grouped within an arc which is substantially less than 180° for magnetically biasing said shaft in the same direction during rotation of said rotor to reduce bearing wear, and spring-retarded non-magnetic, conductive speed indicating means located adjacent to and magnetically coupled with the periphery of said rotor in intersecting relationship with the rotating magnetic field at a point which is isolated from the influence of the advancing field of force produced by said field electromagnets.

3. In an electric speedometer, the combination of a frame, a magetized rotor, means for rotatably mounting said rotor on said frame, a stator having a plurality of field electromagnets located adjacent to and magnetically coupled with the periphery of said magnetized rotor and grouped within an arc which is less than 180°, switch means for sequentially energizing each of said field electromagnets, each of said field electromagnets producing a field of flux, when energized, which magnetically interacts with said magnetized rotor to cause rotation thereof in response to said field of flux, said relative rotation producing a rotating magnetic field, a speed element of non-magnetic, conductive material having a portion thereof intersecting said rotating magnetic field, and means including said speed element magnetically interacting with the rotating magnetic field of said magnetized rotor for indicating its speed of rotation.

4. In an electric speedometer, the combination of a magnetized rotor, stator means supported adjacent to and magnetically coupled with said rotor, said stator means including field electromagnets having windings thereon selectively energized for producing a step-wise advancing field of flux which magnetically interacts with said magnetized rotor to cause rotation thereof in response to said step-wise advancing field of flux, said relative rotation producing a rotating magnetic field, said field electromagnets being grouped within an arc which is substantially less than 180° to prevent reversals in the direction of rotation of said magnetized rotor, a speed indicator mechanism including a speed cup of non-magnetic, conductive material having a peripheral flange located adjacent the periphery of said magnetized rotor at a point radially spaced from said field electromagnets, said radial spacing having the effect to isolate said speed cup from the influence of the step-wise advancing field of flux produced by said field electromagnets, said peripheral flange intersecting said magnetic field of flux for producing a torque on said speed cup, and said indicator mechanism further including spring retarding means to hold said speed cup in a position of equilibrium depending upon the speed of rotation of said magnetized rotor.

5. An electric speedometer, the combination of a frame, a magnetized rotor, means for rotatably mounting said rotor on said frame, a stator having a plurality of field electromagnets mounted adjacent to and magnetically coupled with the periphery of said magnetized rotor and grouped within an arc which is less than 180°, switch means electrically connected to said stator for sequentially energizing said field electromagnets, each of said field electromagnets producing a field of flux, when energized, which magnetically interacts with said magnetized rotor to cause rotation thereof in response to said field of flux, said rotation producing a rotating magnetic field, a speed indicator mechanism including a speed disc of non-magnetic, conductive material supported for pivotal movement relative to said frame, at least a portion of said cup being located adjacent the periphery of said magnetized rotor at a point circumferentially spaced from said field electromagnets and which is isolated fro mthe influence of the fields of force produced by said field electromagnets, said speed disc intersecting said rotating magnetic field for producing a torque thereon, and said speed indicator mechanism further including spring retarding means to hold said speed disc in a position of equilibrium depending upon the speed of rotation of said magnetized rotor.

6. In an electric speedometer, the combination of a frame, a permanently magnetized rotor, means for rotatably mounting said rotor on said frame, a stator having a plurality of field electromagnets located adjacent the periphery of said magnetized rotor and grouped within an arc which is less than 180°, switch means electrically connected to said stator for sequentially energizing said field electromagnets and producing a rotating magnetic field, each of said field electromagnets producing a field of force, when energized, which interacts with said magnetized rotor to cause rotation thereof in response to said field of flux, said rotation producing a rotating magnetic field, a speed indicator mechanism including a speed cup of non-magnetic, conductive material having a peripheral flange supported for pivotal movement relative to said frame, at least a portion of said cup being located adjacent the periphery of said magnetized rotor at a point which is radially spaced from said field electromagnets and isolated from the influence of the fields of force produced by said field magnets, said peripheral flange intersecting said rotating magnetic field for producing a torque on said speed cup, and said speed indicator mechanism further including spring retarding means to hold said speed cup in a position of equilibrium depending upon the speed of rotation of said magnetized rotor.

7. In an electric speedometer, the combination of a frame, a permanently magnetized rotor, means for rotatably mounting said rotor on said frame, a stator having a plurality of field electromagnets supported adjacent the periphery of said magnetized rotor and grouped within an arc which is less than 180°, switch means electrically connected to said stator for sequentially energizing said field electromagnets, each of said field electromagnets producing a field of flux, when energized, which interacts with said magnetized rotor to cause rotation thereof in response to said field of flux, said rotation producing a rotating magnetic field, a speed indicator mechanism including a speed cup of non-magnetic, conductive material supported for pivotal movement relative to said frame, said cup having a peripheral flange located adjacent the periphery of said magnetized rotor at a point which is axially spaced from said field electromagnets and isolated from the influence of the fields of force produced by said field electromagnets, said peripheral flange intersecting said rotating magnetic field for producing a torque on said speed cup in response to the rotation of said rotor, and said speed indicator mechanism further including spring retarding means to hold said speed cup in a position of equilibrium depending on the speed of rotation of said magnetized rotor.

8. In an electric speedometer, the combination of a frame, a shaft rotatably journaled thereon, a magnetized rotor connected to said shaft having a plurality of poles in the upper surface thereof, a plurality of field electromagnets supported adjacent the periphery of said rotor and grouped within an arc which is less than 180°, switch means electrically connected to said stator for sequentially energizing each of said field electromagnets to cause step-wise rotation of said rotor in response to said energization, said rotation producing a rotating magnetic field, means operatively connected to said shaft for indicating the revolutions of said shaft, a staff rotatably journaled on said frame, a speed disc of non-magnetic, conductive material connected to said staff having a portion thereof interacting with the magnetic field of said magnetized rotor, said disc being located tangent to the periphery of said magnetized rotor at a point isolated from the influence of said field electromagnets, and means including said speed disc interacting with the rotating magnetic field produced by said rotor for indicating the speed of rotation thereof.

9. In an electric speedometer, the combination of a frame, a magnetized rotor having a plurality of permanent poles interacting to form a plurality of chordal magnetic circuits in the upper surface of said rotor, means for rotatably mounting said magnetized rotor on said frame, a plurality of field electromagnets located adjacent the periphery of said magnetized rotor and grouped within an arc which is less than 180°, switch means for sequentially energizing said field magnets, each of said field magnets producing a field of force, when energized, which magnetically interacts with said magnetized rotor to cause rotation thereof, a speed disc of non-magnetic, conductive material having a portion thereof located adjacent the periphery of said rotor in intersecting relationship with said chordal magnetic circuits, at a point which is isolated from the influence of said field magnets, and means including said speed disc magnetically coupled and pivotally responsive to said chordal magnetic circuits as said magnetized rotor moves for indicating the speed of rotation thereof.

10. In an electric speedometer, the combination of a frame, a magnetized rotor having first and second pluralities of permanent poles interacting to form a plurality of axially aligned magnetic circuits, means for rotatably mounting said rotor on said frame, a plurality of field magnets grouped within an arc which is less than 180°, each of said field magnets having a core with spaced legs intersecting said axially aligned magnetic circuits, said legs being interconnected by a bight portion having a coil wound thereon, switch means electrically connected to said coils for sequentially energizing said field magnets to produce a step-wise advancing field of force which interacts with said axially aligned magnetic circuits to cause step-wise rotation of said magnetized rotor, an element of non-magnetic, conductive material located adjacent the periphery of said magnetized rotor and having a portion thereof intersecting said axially aligned magnetic circuits, and means including said element magnetically coupled and pivotally responsive to said axially aligned magnetic circuits as said magnetized rotor moves for indicating the speed of rotation thereof.

11. In an electric speedometer, the combination of a frame, a magnetized ring rotor having a first plurality of permanent poles at the inner periphery thereof and a second plurality of permanent poles spaced radially outwardly of said first plurality of poles adjacent the outer periphery of said ring rotor, said first and second plurality of poles interacting to form a plurality of radially directed magnetic circuits, means for rotatably mounting said ring rotor on said frame, a plurality of field magnets grouped within an arc which is less than 180°, each of said field magnets having a core with spaced legs intersecting said radially directed magnetic circuits, said legs being interconnected by a bight portion having a coil wound thereon, switch means electrically connected to said coils for sequentially energizing said field magnets to produce a step-wise advancing field of force which interacts with said radially directed magnetic circuits to cause step-wise rotation of said magnetized rotor, a disc of non-magnetic, conductive material located tangent to the outer periphery of said rotor and having a portion thereof intersecting said radially directed magnetic circuits, and means including said disc magnetically coupled and pivotally responsive to the radially directed magnetic circuits as said magnetized ring rotor moves for indicating the speed of rotation thereof.

12. In an electric speedometer, the combination of a frame, a magnetized rotor having first and second pluralities of permanent poles interacting to form a plurality of axially aligned magnetic circuits, means for rotatably mounting said rotor on said frame, a plurality of field magnets grouped within an arc which is less than 180°, each of said field magnets having a core located adjacent one surface on said magnetized rotor, each of said cores having a coil wound thereon, switch means electrically connected to said coils for sequentially energizing said field magnets to produce a step-wise advancing field of force which interacts with said axially aligned magnetic circuits to cause step-wise rotation of said magnetized rotor, a cup-shaped element of non-magnetic, conductive material having an axially directed peripheral flange in surrounding relationship with the upper half of said magnetized rotor to intersect said axially aligned magnetic circuits, and means including said cup-shaped element magnetically coupled and pivotally responsive to said axially aligned magnetic circuits as said magnetized rotor moves for indicating the speed of rotation thereof.

13. In an electric speedometer, the combination of a frame, a magnetized ring rotor having a first plurality of permanent poles at the outer periphery thereof, a second plurality of permanent poles at the inner periphery of said ring rotor, said first plurality of poles interacting to form a first plurality of chordal magnetic circuits along the outer periphery of said ring rotor and said second plurality of poles interacting to form a second plurality of chordal magnetic circuits along the inner periphery of said ring rotor, means for rotatably mounting said ring rotor on said frame, a plurality of field magnets grouped within an arc which is less than 180°, each of said field magnets having a core with an axially directed portion spaced radially outwardly of the outer periphery of said rotor, a coil wound on each of said cores, switch means electrically connected to said coils for sequentially energizing said field poles to produce a step-wise advancing field of force which magnetically interacts with said first plurality of chordal magnetic circuits to cause step-wise rotation of said magnetized ring rotor, a cup-shaped element of non-magnetic, conductive material having an axially directed peripheral flange portion located adjacent the inner periphery of said ring rotor in intersecting relationship with said second plurality of chordal magnetic circuits, and means including said cup-shaped element magnetically coupled and pivotally responsive to said second plurality of chordal magnetic circuits as said ring rotor moves to indicate the speed of rotation thereof.

14. In an electric speedometer, the combination of a frame, a magnetized ring rotor having an inwardly located sloping face on its bottom surface, a plurality of permanent poles at the outer periphery of said ring rotor in the lower surface thereof, a second plurality of permanent poles at the outer periphery of said ring rotor in the top surface thereof, said first and second plurality of poles interacting to form a plurality of axially aligned magnetic circuits, a third plurality of permanent poles on said inwardly located sloping face of said ring rotor interacting to form a plurality of chordal magnetic circuits along the inner periphery of said ring rotor, means for rotatably mounting said ring rotor on said frame, a plurality of field magnets grouped within an arc which is less than 180°, each of said field magnets having a core with spaced legs intersecting said axially aligned magnetic circuits, said legs being interconnected by a bight portion having a coil wound thereon, switch means electrically connected to said coils for sequentially energizing said field magnets to produce a step-wise advancing field of force which interacts with said axially aligned magnetic circuits to cause step-wise rotation of said ring rotor, a speed disc of non-magnetic, conductive material having an outer peripheral portion located in spaced parallelism with said sloping face in intersecting relationship with said plurality of chordal magnetic circuits, and means including said speed disc magnetically coupled and pivotally responsive to the said chordal magnetic circuits during movement of said ring rotor for indicating the speed of rotation thereof.

15. In an electric speedometer, the combination of a frame, a magnetized ring rotor having a first plurality of permanent poles at the outer periphery thereof, a second plurality of permanent poles at the inner periphery of said ring rotor, said first plurality of poles interacting to form a first plurality of chordal magnetic circuits along the outer periphery of said ring rotor and said second plurality of poles interacting to form a second plurality of chordal magnetic circuits along the inner periphery of said ring rotor, means for rotatably mounting said rotor on said frame, a plurality of field magnets, each of said field magnets having a core spaced radially inwardly of the inner periphery of said ring rotor, a coil wound on each of said cores, switch means electrically connected to said coils for sequentially energizing said field magnets to produce a step-wise advancing field of force which interacts with said second plurality of chordal magnetic circuits to cause step-wise rotation of said ring rotor, a cup-shaped element of non-magnetic, conductive material having an axially directed peripheral flange portion located adjacent the outer periphery of said ring rotor in intersecting relationship with said first plurality of chordal magnetic circuits, and means including said cup-shaped element magnetically coupled and pivotally responsive to said second plurality of chordal magnetic circuits as said ring rotor moves to indicate the speed of rotation thereof.

16. In an electric speedometer, the combination of a frame, a magnetized rotor having a plurality of poles interacting to form a plurality of chordal magnetic circuits, means for rotatably mounting said rotor on said frame, a plurality of field magnets grouped within an arc which is less than 180°, each of said field magnets including an arcuate core having radially inwardly directed end portions located at points near to but spaced from the outer periphery of said rotor, a coil wound on each of said arcuate cores between said end portions, switch means electrically connected to said coils for sequentially energizing said field magnets to produce a step-wise advancing field of force which interacts with said plurality of chordal magnetic circuits to cause step-wise rotation of said magnetized rotor, a disc of non-magnetic, conductive material having a portion thereof located adjacent the periphery of said rotor in intersecting relationship with said plurality of chordal magnetic circuits, and means including said disc magnetically coupled and pivotally responsive to said chordal magnetic circuits as said magnetized rotor moves for indicating the speed of rotation thereof.

17. In an electric speedometer, the combination of a frame, a magnetized rotor having a plurality of poles interacting to form a plurality of chordal magnetic circuits, means for rotatably mounting said rotor on said frame, a plurality of field magnets grouped within an arc which is less than 180°, each of said field magnets having a core portion substantially in the plane of said rotor, a coil wound on each of said core portions, switch means electrically connected to said coils for sequentially energizing said field magnets to produce a step-wise advancing field of force which interacts with said plurality of chordal magnetic circuits to cause step-wise rotation of said magnetized rotor, a segment of a cup-shaped element of non-magnetic, conductive material located adjacent said magnetized rotor at a point which is isolated from the influence of the field of force produced by said field magnets, said segment having an axially directed leg located radially spaced from the periphery of said rotor in intersecting relationship with said plurality of chordal magnetic circuits, said segment further having a radially inwardly directed arm substantially in the plane of said rotor, and means including said axially directed leg of said segment magnetically coupled and pivotally responsive to said plurality of chordal magnetic circuits when said rotor moves for indicating the speed of rotation thereof.

18. In an electric meter for measuring the speed of a rotating part, the combination of a frame, a shaft rotatably journaled thereon, a rotor connected to said shaft, a plurality of field magnets grouped within an arc which is less than 180°, means for sequentially energizing said field magnets to produce a rotating field and cause step-wise rotation of said rotor, a sleeve connected to said shaft having a radially outwardly directed flange, and an annular weight supported by said radially outwardly directed flange adapted to slidably engage said sleeve as said rotor accelerates or decelerates during its step-wise rotation for smoothing out irregularities in the movement of said rotor.

19. In an electric speedometer, the combination of a frame, a permanently magnetized rotor, means for rotatably mounting said magnetized rotor on said frame, a plurality of field magnets located adjacent the periphery of said magnetized rotor, means for sequentially energizing said field magnets to produce a rotating field and cause step-wise rotation of said magnetized rotor, a first staff rotatably journaled on said frame, a non-magnetic, conductive element connected to said staff having a portion thereof intersecting the rotating magnetic field of said magnetized rotor and interacting therewith to move in a predetermined rotative direction, a first regulating hairspring connected to said first staff and to said frame for restraining rotation of said non-magnetic, conductive element, a second staff on said frame, sleeve means rotatably mounted on said second staff, and a second hairspring interconnecting said first staff and said sleeve means for dampening oscillations transmitted from said first staff to said sleeve means.

20. In an electric speedometer, the combination of a frame, a permanently magnetized rotor, means for rotatably mounting said magnetized rotor on said frame, a plurality of field magnets located adjacent the periphery of said magnetized rotor, means for sequentially energizing said field magnets to cause step-wise rotation of said magnetized rotor and produce a rotating magnetic field, a staff rotatably journaled on said frame, sleeve means rotatably mounted on said staff, a non-magnetic, conductive element connected to said sleeve means having a portion thereof intersecting the rotating magnetic field of said magnetized rotor and interacting therewith to move in a predetermined rotative direction, a first regulating hairspring connected to said staff and to said non-magnetic, conductive element for dampening oscillations of said non-magnetic, conductive element, and a second hairspring connected to said staff and to said frame for restraining rotation of said non-magnetic, conductive element.

References Cited by the Examiner

UNITED STATES PATENTS

| | | | |
|---|---|---|---|
| 2,164,964 | 7/1939 | Topalov | 200—24 |
| 2,648,019 | 8/1953 | Rodanet | 324—70 |
| 2,674,447 | 4/1954 | Sivacek | 73—519 |
| 2,838,694 | 6/1958 | Hider | 200—24 |
| 2,843,742 | 7/1958 | Cluwen | 318—160 |
| 2,871,433 | 1/1959 | Wargo | 324—70 |
| 2,949,778 | 8/1960 | Hemion et al. | 324—105 |
| 2,979,367 | 4/1961 | Mims et al. | 310—90 |
| 3,002,384 | 10/1961 | MacDonald et al. | 324—70 |
| 3,059,180 | 10/1962 | Gentner | 324—70 |
| 3,066,541 | 12/1962 | Ronney | 73—520 |

FOREIGN PATENTS

| | | |
|---|---|---|
| 566,691 | 11/1958 | Canada. |
| 375,816 | 6/1932 | Great Britain. |

WALTER L. CARLSON, *Primary Examiner.*

FREDERICK M. STRADER, *Examiner.*

C. W. HOFFMANN, M. J. LYNCH,
*Assistant Examiners.*